United States Patent
Das et al.

(10) Patent No.: US 10,866,849 B2
(45) Date of Patent: Dec. 15, 2020

(54) SYSTEM AND METHOD FOR AUTOMATED COMPUTER SYSTEM DIAGNOSIS AND REPAIR

(71) Applicant: AMERICAN EXPRESS TRAVEL RELATED SERVICES COMPANY, INC., New York, NY (US)

(72) Inventors: Sumen Das, St. Petersburg, FL (US); Traci L. Harris, Phoenix, AZ (US); Howard M. Hecht, Phoenix, AZ (US); Sreedhar R. Komaragiri, St. Petersburg, FL (US); Richard Kronengold, New York, NY (US); Andrew M. Meehl, Phoenix, AZ (US); Lalat Nayak, St. Petersburg, FL (US); Julie Scott, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 110 days.

(21) Appl. No.: 15/407,827

(22) Filed: Jan. 17, 2017

(65) Prior Publication Data
US 2018/0203755 A1    Jul. 19, 2018

(51) Int. Cl.
*G06F 11/00*    (2006.01)
*G06F 11/07*    (2006.01)

(52) U.S. Cl.
CPC ........ *G06F 11/0709* (2013.01); *G06F 11/079* (2013.01); *G06F 11/0793* (2013.01)

(58) Field of Classification Search
CPC ............. G06F 11/0742; G06F 11/0748; G06F 11/0793; G06F 11/3664; G06F 21/568; G06F 8/65; G06F 11/1458; G06F 11/3409; G06Q 10/20; H04L 41/0803
See application file for complete search history.

(56) References Cited

U.S. PATENT DOCUMENTS

| | | | | |
|---|---|---|---|---|
| 5,937,415 A * | 8/1999 | Sheffield | ........... | G06F 17/30595 |
| 6,170,065 B1 * | 1/2001 | Kobata | ............... | G06F 11/0709 |
| | | | | 714/38.14 |
| 6,757,837 B1 * | 6/2004 | Platt | .................... | G06F 11/0748 |
| | | | | 714/38.13 |
| 7,620,848 B1 * | 11/2009 | Tanner | ................ | G06F 11/0709 |
| | | | | 709/224 |
| 7,873,677 B2 * | 1/2011 | Messing | ............... | G06F 16/957 |
| | | | | 707/805 |

(Continued)

*Primary Examiner* — Loan L. T. Truong
(74) *Attorney, Agent, or Firm* — Thomas | Horstemeyer, LLP

(57) ABSTRACT

A system and method for automated computer system diagnosis and repair is provided. The system and method may allow for the automated diagnosis and repair of computer system errors without needing a user to manually engage a service desk, help desk, and/or the like. A user terminal may interact with a tech care module to generate a user repair request comprising the computer system error and data relating to the error. The system may analyze the user repair request and retrieve a repair script relating to the computer system error. The system may execute the repair script on the user terminal to resolve the computer system error. The system may also implement reporting modules to ensure that the computer system error is remediated and to update the repair scripts.

20 Claims, 5 Drawing Sheets

(56) References Cited

U.S. PATENT DOCUMENTS

| | | | | |
|---|---|---|---|---|
| 8,527,814 B1* | 9/2013 | Elwell | | G06F 11/0793 |
| | | | | 714/2 |
| 8,607,328 B1* | 12/2013 | Hodges | | G06F 21/568 |
| | | | | 713/165 |
| 8,706,762 B1* | 4/2014 | Patzer | | G06F 16/9535 |
| | | | | 707/790 |
| 8,755,783 B2* | 6/2014 | Brahami | | G07F 17/40 |
| | | | | 455/418 |
| 9,198,060 B2* | 11/2015 | Terwilliger | | H04B 5/0031 |
| 9,213,578 B2* | 12/2015 | Das | | G06N 5/02 |
| 9,413,893 B2* | 8/2016 | Hurst | | H04M 3/5232 |
| 9,524,214 B1* | 12/2016 | Isdal | | G06F 11/1438 |
| 9,558,060 B1* | 1/2017 | Cessac | | G06F 3/04842 |
| 9,659,176 B1* | 5/2017 | Roter | | G06F 21/568 |
| 9,767,009 B2* | 9/2017 | Cobb, Jr. | | G06F 11/3688 |
| 9,803,880 B2* | 10/2017 | Jung | | F24F 11/62 |
| 9,817,709 B2* | 11/2017 | Gowin | | G06F 11/0793 |
| 10,649,759 B1* | 5/2020 | Delange | | G06F 11/2094 |
| 2004/0168164 A1* | 8/2004 | Shevchenko | | G06F 11/2257 |
| | | | | 717/168 |
| 2005/0227683 A1* | 10/2005 | Draluk | | H04L 67/125 |
| | | | | 455/419 |
| 2008/0201780 A1* | 8/2008 | Khan | | G06F 21/577 |
| | | | | 726/25 |
| 2008/0208610 A1* | 8/2008 | Thomas | | G06Q 30/02 |
| | | | | 705/1.1 |
| 2008/0262860 A1* | 10/2008 | Schneider | | G06Q 10/10 |
| | | | | 705/1.1 |
| 2008/0276123 A1* | 11/2008 | Sudhakar | | G06F 11/1469 |
| | | | | 714/6.12 |
| 2009/0024514 A1* | 1/2009 | Kumaran | | G06Q 10/0637 |
| | | | | 705/37 |
| 2009/0106327 A1* | 4/2009 | Dilman | | G06F 11/0727 |
| 2009/0172460 A1* | 7/2009 | Bobak | | G06F 11/0709 |
| | | | | 714/2 |
| 2009/0313678 A1* | 12/2009 | Guenter | | G06F 21/31 |
| | | | | 726/2 |
| 2010/0211815 A1* | 8/2010 | Mankovskii | | G06F 11/0748 |
| | | | | 714/2 |
| 2011/0060945 A1* | 3/2011 | Leprince | | G06F 11/0748 |
| | | | | 714/25 |
| 2011/0221592 A1* | 9/2011 | Maziak | | G06F 11/0748 |
| | | | | 340/540 |
| 2011/0264964 A1* | 10/2011 | Murphy | | G06F 11/0709 |
| | | | | 714/48 |
| 2011/0283138 A1* | 11/2011 | Sangubhatla | | H04L 41/0813 |
| | | | | 714/15 |
| 2012/0297389 A1* | 11/2012 | Haham | | G06F 8/445 |
| | | | | 718/102 |
| 2013/0298116 A1* | 11/2013 | Ou | | G06F 8/65 |
| | | | | 717/170 |
| 2014/0222662 A1* | 8/2014 | Bierwas | | G06F 9/541 |
| | | | | 705/39 |
| 2014/0237090 A1* | 8/2014 | Lassen | | H04L 41/082 |
| | | | | 709/223 |
| 2014/0253289 A1* | 9/2014 | Groth | | H05K 7/1498 |
| | | | | 340/8.1 |
| 2014/0289573 A1* | 9/2014 | Bennah | | G06F 11/0769 |
| | | | | 714/48 |
| 2016/0132421 A1* | 5/2016 | Cobb, Jr. | | G06F 11/368 |
| | | | | 717/131 |
| 2016/0291970 A1* | 10/2016 | Mallisetty | | G06F 8/71 |
| 2017/0141946 A1* | 5/2017 | Balestrazzi | | H04L 41/0686 |
| 2017/0153938 A1* | 6/2017 | Liu | | G05B 23/02 |
| 2017/0161138 A1* | 6/2017 | Oleynikov | | G06F 11/0769 |
| 2017/0228220 A1* | 8/2017 | Dai | | G06F 11/362 |
| 2018/0139108 A1* | 5/2018 | Fulton | | H04L 41/5093 |
| 2018/0253362 A1* | 9/2018 | Reinecke | | G06F 9/45558 |
| 2018/0260310 A1* | 9/2018 | Vorganti | | G06F 11/3684 |

* cited by examiner

SYSTEM AND METHOD FOR AUTOMATED COMPUTER SYSTEM DIAGNOSIS AND REPAIR

FIELD

The disclosure generally relates to computer system diagnosis and repair, and more specifically, to systems and methods for automated computer system diagnosis and repair.

BACKGROUND

Computer system users may manually contact (e.g., via a phone call, email, and/or the like) a computer support desk in response to receiving a computer system error or problem on their computer system. Typical support desk calls may require human interaction, leading to a subjective and delayed diagnosis and repair of the computer system error.

For example, users may call a service desk to report an error or problem with their computer system. Service desk personnel may ask subjective questions about the error or problem, manually research the error or problem, and then attempt to fix the error or problem (e.g., by asking the user to perform steps on their computer system, by remotely connecting to the user's computer system to manually perform steps, etc.). If the service desk personnel are unable to resolve the computer system problem, the service desk personnel may notify an upper level support team, further delaying resolution of the error.

SUMMARY

Systems, methods, and articles of manufacture (collectively, the "system") for automated computer system diagnosis and repair are disclosed. In various embodiments, the system may receive a user repair request. The user repair request may comprise a computer system error. The system may analyze the user repair request. The system may retrieve a repair script related to the user repair request. The system may execute the repair script.

In various embodiments, the user repair request may be transmitted by a user terminal. The computer system error may be related to the user terminal and the user terminal may comprise a user terminal profile comprising at least one of a hardware configuration or a software configuration. The repair script may be executed on the user terminal. The repair script may comprise at least one logical repair step.

In various embodiments, the system may receive a repair report comprising data relating to the execution of the repair script. The system may analyze the repair report to determine whether the repair script resolved the computer system error from the user repair request. The system may generate a historical repair report comprising data relating to the analysis of the repair report.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
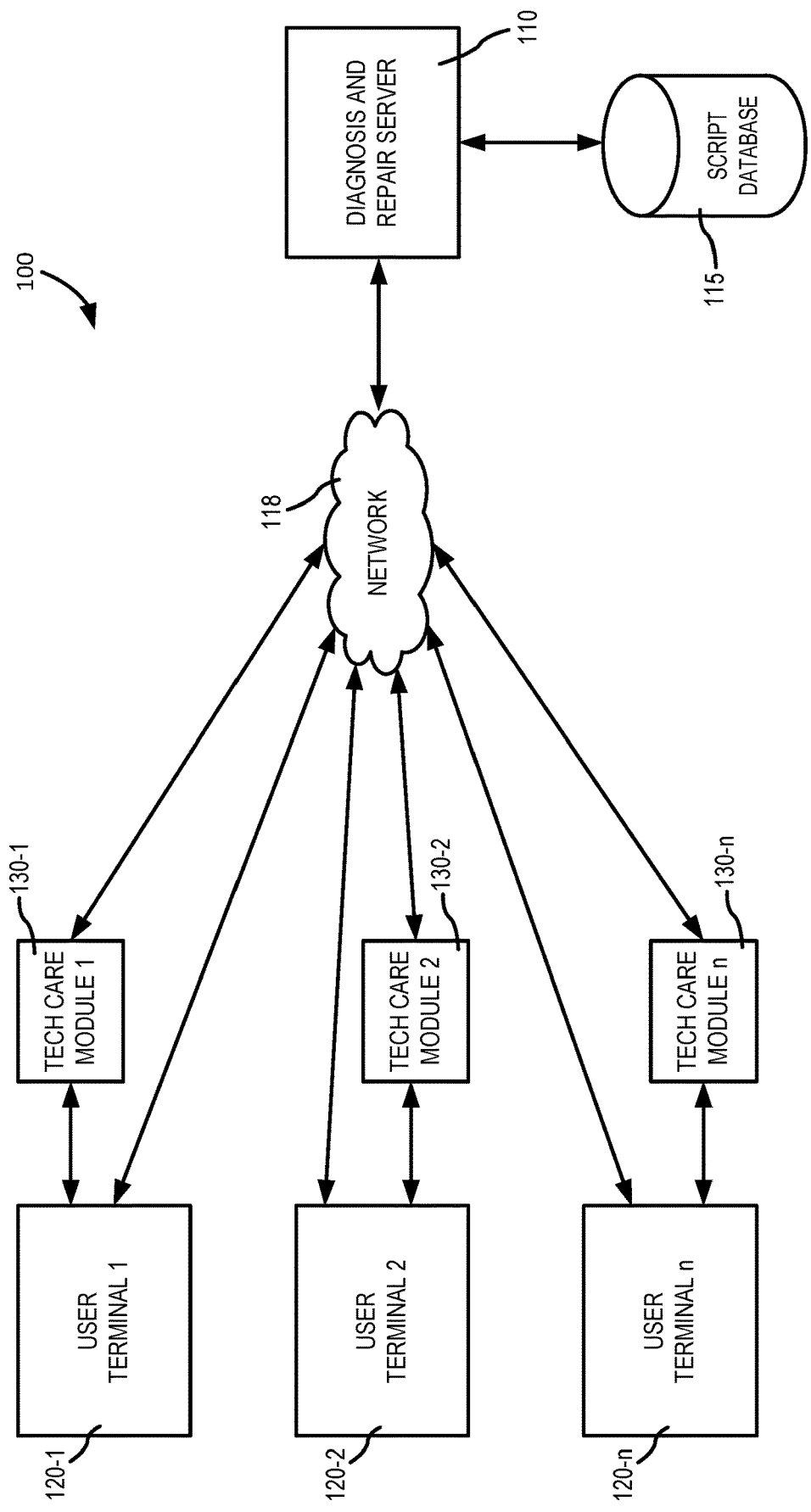
FIG. 1 is a block diagram illustrating various system components of a system for automated computer system diagnosis and repair, in accordance with various embodiments.

In various embodiments, and with reference to FIG. 1, a system 100 for automated computer system repair is provided. System 100 may allow for the automated repair of computer systems without (or minimal need for) a user needing to engage or call a computer service desk (and/or similar type help desk) to remediate the computer system error. In that regard, system 100 allows for the delivery of repair scripts to remediate computer system errors, wherein such errors may cause significant usage or call volume to computer service desk. Aspects of the current invention may enable a reduction of service desk usage by at least 10% to 15%. Moreover, by providing an automated solution to resolving computer system errors, system 100 may also stabilize computer system health and increase computer system performance.

In various embodiments, system 100 may comprise a diagnosis and repair server 110. Diagnosis and repair server 110 may be configured as a central hub to receive, parse, and/or transmit data. In that regard, diagnosis and repair server 110 may comprise a computer-based system, a processor, and/or any other suitable device capable of receiving, parsing, and/or transmitting data. Diagnosis and repair server 110 may be in logical communication with a network 118 and/or a script database 115. In various embodiments, diagnosis and repair server 110 may be configured to receive user repair requests, analyze the user repair request, retrieve a repair script related to the user repair request, and transmit the user repair request (as described in further detail herein).

In various embodiments, system 100 may comprise a script database 115. Script database 115 may comprise any suitable system, database, and/or the like capable of receiving and storing data. In that regard, script database 115 may be configured to receive and/or store one or more repair scripts. The repair scripts may comprise a script, executable file, batch file, and/or the like comprising one or more repair steps directed to resolving a computer system error. Each repair step may be configured to execute in order to resolve the computer system error. In various embodiments, the repair scripts may also comprise dynamic logical repair steps. In that regard, each logical repair step may be configured to execute and return a repair result value (e.g., a pass, a fail, an exception, and/or the like). For example, a "fail" may occur in response to a file being locked, wherein the dynamic logical repair step is configured to delete the file; or in response to an unexpected result (e.g., a registry key value is set to "XXX", and when checked after execution the registry key value is set to "YYY"); and/or the like. The repair result value may then determine the next logical repair step to execute. For example, in response to a first logical repair step returning a repair result value of "pass", a second logical repair step may execute. In response to the first logical repair step returning a repair result value of "fail" and/or "exception", for example, a third logical repair step may execute. As a further example, each dynamic logical repair step may also comprise a repair step ID (e.g., 1, 2, 3, 4, etc.). Each dynamic logical repair step may comprise a pass ID (e.g., the next dynamic logical repair step to execute in response to a "pass") and/or a fail ID (e.g., the next dynamic logical repair step to execute in response to a "fail" and/or an "exception"). For example, in response to the repair step ID 1 executing a "pass", the pass ID may comprise repair step ID 2, and repair step ID 2 may be executed. In response to the repair step ID 1 failing or generating an exception, the fail ID may comprise repair step ID 3, and repair step ID 3 may be executed.

In various embodiments, the repair scripts may also comprise metadata, tags, data markers, and/or the like indicating properties of the repair script, such as, for example, the corresponding computer system program (e.g., Microsoft Internet Explorer®), the corresponding computer system error (e.g., "Error Code 50004"), a repair script ID, and/or the like. The metadata, tags, data markers, and/or the like may be associated with the repair scripts in script database 115, and stored in a lookup table and/or the like. In various embodiments, the repair scripts may be stored and/or formatted in script database 115 using any suitable technique described herein and/or known in the art. For example, the repair scripts may be grouped by computer system program (e.g., repair scripts related to the internet or Internet Explorer® may be grouped, the repair scripts related to email or Microsoft® Outlook® may be grouped, etc.), and/or any other suitable grouping. In various embodiments, the repair scripts may also be ordered by repair script ID, and/or any other suitable ordering.

In various embodiments, user terminals 120 may interact with diagnosis and repair server 110 via a network 118. In that regard, user terminals 120 and diagnosis and repair server 110 may be directly interconnected by network 118, and/or user terminals 120 and diagnosis and repair server 110 may be interconnected by network 118 via a tech care module 130 (as described in further detail below). Network 118 may comprise any suitable network allowing interconnectivity and/or communication between user terminals 120 and diagnosis and repair server 110. For example, and as used herein, the term "network" may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

In various embodiments, system 100 may comprise one or more user terminals 120. For example, system 100 may comprise a first user terminal 120-1, a second user terminal 120-2, and/or an "Nth" user terminal 120-n. Each user terminal 120 may comprise hardware and/or software capable of allowing a user access to system 100. For example, user terminals 120 may comprise any suitable device allowing the user to communicate with network 118, such as a personal computer, personal digital assistant, cellular phone, kiosk, and/or the like. In various embodiments, each user terminal 120 may comprise various software applications installed on user terminal 120. During user interactions with user terminal 120, a user may receive a computer system error. The computer system error may comprise any type of error received by the user relating to hardware and/or software applications on user terminal 120. For example, the user may receive a computer system error when attempting to open and/or access a software application, during use of the software application, and/or during any other suitable time.

In various embodiments, each user terminal 120 may comprise a user terminal profile. The user terminal profile may comprise data relating to hardware and/or software configurations present on each user terminal 120. For example, the user terminal profile may comprise data relating to each user terminal 120 hardware configurations such as, for example, CPU speed, RAM capacity, RAM speed, hard drive storage (e.g., available hard drive space, total hard drive space, etc.), and/or similar such hardware configuration attributes. The user terminal profile may also comprise data relating to each user terminal 120 software configurations such as, for example, the installed operating system, installed software (e.g., Microsoft® Outlook®, Internet Explorer®, Google Chrome®, Adobe Reader®, Java®, etc.), installed software versions (e.g., Internet Explorer® version 9, etc.), and/or other such software configuration attributes. Each user terminal profile may be stored locally on each respective user terminal 120, and/or may be stored remotely on diagnosis and repair server 110. In that regard, diagnosis and repair server 110 may query each user terminal 120, via network 118, to determine the user profile for the user terminal. Diagnosis and repair server 110 may store each user terminal profile based on the IP address of each respective user terminal 120, a MAC address of each user terminal 120, and/or through any other suitable identifier.

In various embodiments, system 100 may comprise one or more tech care modules 130. For example, system 100 may comprise a first tech care module 130-1, a second tech care module 130-2, and/or an "Nth" tech care module 130-n. Each tech care module 130 may be configured to communicate with user terminals 120. In various embodiments, each tech care module 130 may comprise software installed on a corresponding user terminal 120 (e.g., tech care module 130-1 may be installed on user terminal 120-1, tech care module 130-2 may be installed on user terminal 120-3, and/or tech care module 130-n may be installed on user terminal 120-n). For example, each tech care module 130 may communicate with each respective user terminal 120 via Windows Communication Foundation (WCF), and/or through any other suitable protocol and/or service allowing for the transmission of data. In various embodiments, tech care modules 130 may also comprise a separate server in logical communication with each user terminal 120. In that regard, system 100 may comprise any suitable number of such as, for example, a single tech care module 130 in logical communication with each user terminal 120, a separate tech care module 130 for each respective user terminal 120 (e.g., tech care module 130-1 for user terminal 120-1, tech care module 130-2 for user terminal 120-2, and/or tech care module 130-n for user terminal 120-n), and/or any other suitable number of tech care modules 130.

In various embodiments, tech care modules 130 may be configured as an access point to allow users to transmit a user repair request, via user terminals 120, related to a computer system error. For example, in response to a user accessing tech care module 130 (e.g., by opening the application in the system tray, double-clicking on an executable icon, accessing a web page, etc.), tech care module 130 may display, via user terminal 120, a repair prompt for the user. In various embodiments, the repair prompt may display software application options for the user to select (e.g., the user may select the software application they are receiving the computer system error from). Tech care module 130 may only display those software applications installed on the corresponding user terminal 120, by reviewing the user terminal profile associated with user terminal 120 (e.g., by reviewing the software configurations contained in the user terminal profile to determine the software applications installed on that corresponding user terminal 120). For example, tech care module 130 may display "Web Browser", "Email and Chat", "Connectivity", "Access and Password Reset", "Operating System", "Printers", and/or any other suitable software application. In response to the user selecting a software application from the repair prompt, tech care module 130 may display the available repair scripts related to that software application. Tech care module 130 may query script database 115, via network 118 and diagnosis and repair server 110, to return all repair scripts related to the select software application. For example, where the software application selected from the repair prompt is "Email and Chat", tech care module 130 may query script database 115, via a lookup table and/or the like, for repair scripts having metadata, tags, and/or the like indicating a corresponding software application for email (e.g., Microsoft® Outlook®). The user may then scroll through the repair scripts and select the repair script related to the computer system error experienced on the user terminal 120. For example, tech care module 130 may display the titles of the repair scripts, the corresponding computer system error for each repair script, and/or the like, to enable the user to select the correct repair script. Tech care module 130 may transmit the user's selection (e.g., the user repair request), via network 118, to diagnosis and repair server 110 for analysis and retrieval of the repair script.

In various embodiments, the user may also interact with tech care module 130 by manually inputting a user repair request comprising a description of the computer system error (e.g., by inputting text describing the computer system error). Tech care module 130 may transmit the user repair request, via network 118, to diagnosis and repair server 110. Diagnosis and repair server 110 may analyze and parse the user repair request to determine key repair words associated with the error, such as, for example, the corresponding software application, the software error, and/or the like. In response to determining the key repair words associated with the error, diagnosis and repair server 110 may query script database 115 to locate a repair script comprising the key repair words that satisfy or match the request. In that regard, diagnosis and repair server 110 may query script database 115 for an exact match, a partial match (e.g., 70%, 80%, 90%, etc.), synonymous terms, related terms, and/or the like.

In various embodiments, tech care modules 130 may implement various software and/or hardware components to facilitate input of the user repair request from user terminals 120. For example, tech care modules 130 may implement a chatbot component to facilitate communications with each tech care module 130. In various embodiments, the chatbot component may also be separately installed on each user terminal 120 and configured to interact with each respective tech care module 130. The chatbot component may comprise a service powered by rules, machine learning, and artificial intelligence, enabling a user to interact via a chat interface allowing multiple language support (e.g., English, French, Spanish, etc.). The chatbot component may comprise any suitable talkbot, chatbot, chatterbox, artificial conversational entity, and/or the like customized and/or configured for system 100, and capable of conducting an automated textual and/or auditory conversation with user terminals 120, such as, for example Microsoft® Chatbot, Ultra Hal Assistant, Aztekium Bot, Mitsuku, Jabberwacky, Cleverbot, and/or any other suitable chatbot component.

For example, in various embodiments, the chatbot component may display a chatbot dialog box on user terminal 120 to allow a user to interact with tech care module 130 by inputting information about the error or problem they are encountering. Tech care modules 130, via the chatbot component, may analyze and parse the user input, and query script database 115, via network 118 and diagnosis and repair server 110, to locate the repair script matching the user input. For example, the chatbot component may receive a user input, parse the user input, and attempt to match key words from the input to a computer system error. The chatbot component may also monitor the corresponding user terminal 120 (e.g., monitor processor speeds, monitor error logs, etc.) to intelligently parse the user input to determine the computer system error. In response to determining the computer system error, tech care modules 130 may transmit, via network 118, the user repair request comprising the computer system error to diagnosis and repair server 110, for retrieval and transmission of the corresponding repair script. After execution of the repair script, the chatbot component may ask the user if the computer system error is resolved. In response to being unable to match the user input to a computer system error, the chatbot component may transmit the follow up repair question asking for additional information. For example, the follow up repair question may ask the user for the computer system error code, the application receiving the error, and/or any other request for additional related information. In response to being unable to locate a corresponding repair script, the chatbot component may direct the user to a help desk, support person, and/or the like. By implementing the chatbot component, tech care modules 130 may engage in an automated dialog with user terminal 120, wherein through analysis and follow up repair questions, the computer system error may better be identified.

In various embodiments, tech care modules 130 may also be configured to monitor user terminals 120. Tech care modules 130 may monitor user terminals 120 in real time, near real time, in time intervals (e.g., once a minute, once an hour, once a day, once a month, etc.), and/or based on a system event (e.g., after an update has installed on user terminal 120) or system non-event (e.g., lack of update). In various embodiments, tech care modules 130 may monitor each user terminal 120 to detect a computer system error. For example, tech care modules 130 may monitor event logs, system logs, error logs, and/or the like residing on each user terminal 120. Each tech care module 130 may continue monitoring until a computer system error is detected (e.g., the event log, system log, error log, and/or the like displays a computer system error). Tech care modules 130 may thus enable the detection and diagnosing of computer system errors on user terminals 120 without needing a user to manually interact with system 100.

In various embodiments, in response to receiving the repair script from diagnosis and repair server 110, via network 118, tech care modules 130 may execute the repair script on the corresponding user terminal 120.

Figure 2:
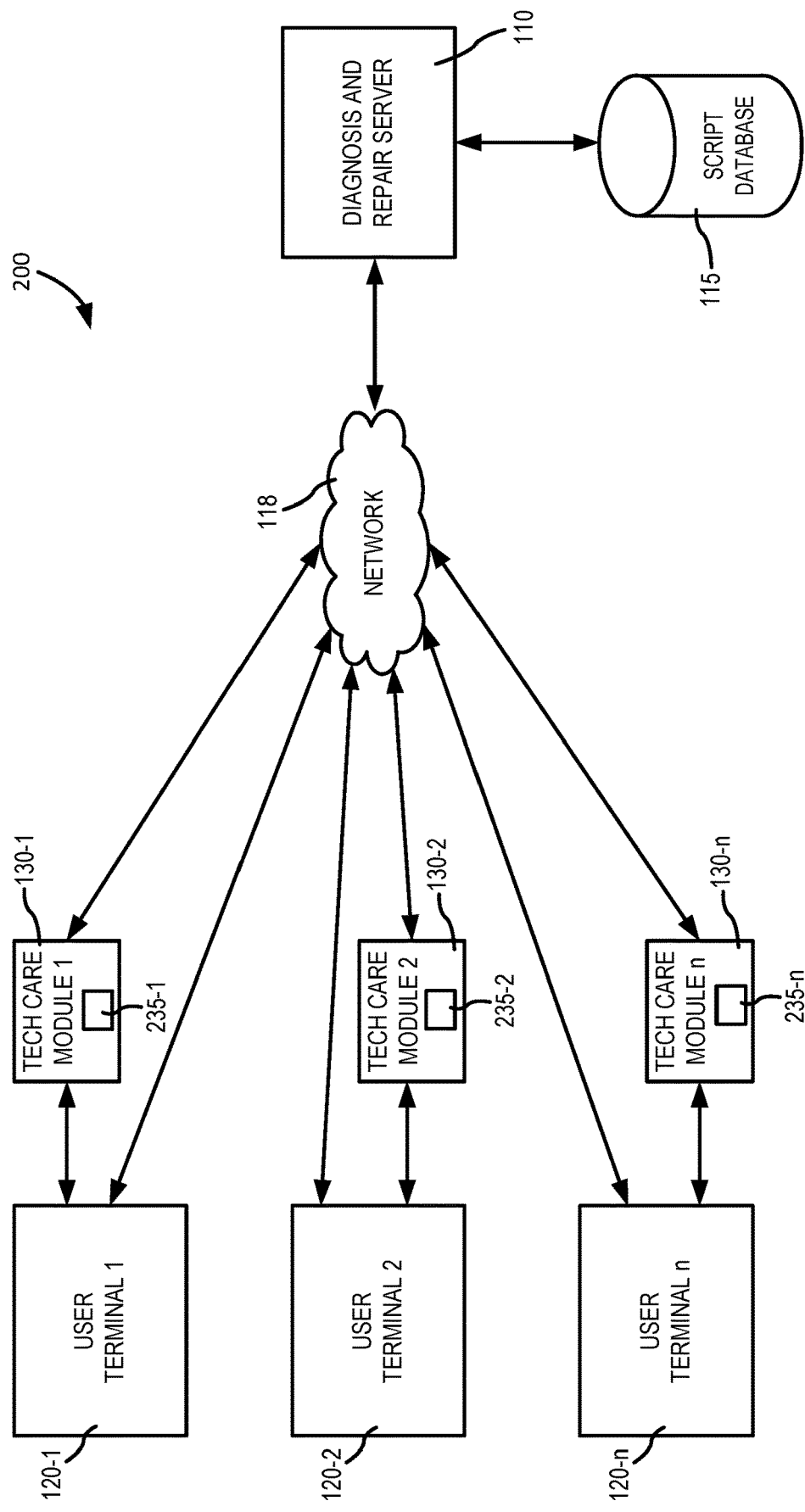
FIG. 2 is a block diagram illustrating various system components of a system for automated computer system diagnosis and repair including a repair reporting module, in accordance with various embodiments.

In various embodiments, and with reference to FIG. 2, a system 200 for automated system repair may also comprise one or more repair reporting modules 235. In various embodiments, repair reporting modules 235 may comprise a module of tech care modules 130. Each tech care module 130 may comprise a repair reporting module 235. For example, tech care module 130-1 may comprise a repair reporting module 235-1, tech care module 130-2 may comprise a repair reporting module 235-2, and/or tech care module 130-n may comprise a repair reporting module 235-n.

In various embodiments, repair reporting modules 235 may monitor the execution of the repair script on the corresponding user terminal 120 to detect whether the repair script is resolving the computer system error. For example, repair reporting modules 235 may monitor for any errors and/or exceptions generated during the repair process. Repair reporting modules 235 may monitor a system log, error log, and/or the like on the user terminal 120 to determine whether any errors and/or exceptions are generated during the repair process. In various embodiments, repair reporting modules 235 may also be configured to display a repair reporting prompt on the corresponding user terminal 120 after execution of the repair script. For example, the repair reporting prompt may ask the user whether the computer system error is resolved and for any additional follow up, as needed. In response to the user completing the repair reporting prompt, repair reporting modules 235 may generate a repair report comprising the user's answers to the repair reporting prompt and/o the detected errors and/or exceptions, and transmit the repair report, via network 118, to diagnosis and repair server 110.

In various embodiments, diagnosis and repair server 110 may analyze the repair report to determine the success and failures of each repair script. For example, diagnosis and repair server 110 may track each success and each failure of the each repair script to determine a repair success rate (e.g., 90% success rate, etc.) for each repair script. Diagnosis and repair server 110 may generate a historical repair report comprising data relating to each repair script. Diagnosis and repair server 110 may transmit the historical repair report for review (e.g., to a system administrator and/or the like). The historical repair report may enable review of the repair scripts to determine accuracy and efficiency of each repair script, repair steps, and/or each dynamic logical repair steps. In various embodiments, diagnosis and repair server 110 may dynamically update each repair script based on the historical repair report by removing and/or revising the repair steps and/or dynamic logical repair steps. For example, in response to a repair step failing on 95% of user terminals, diagnosis and repair server 110 may remove the repair step from the repair script.

Figure 3:
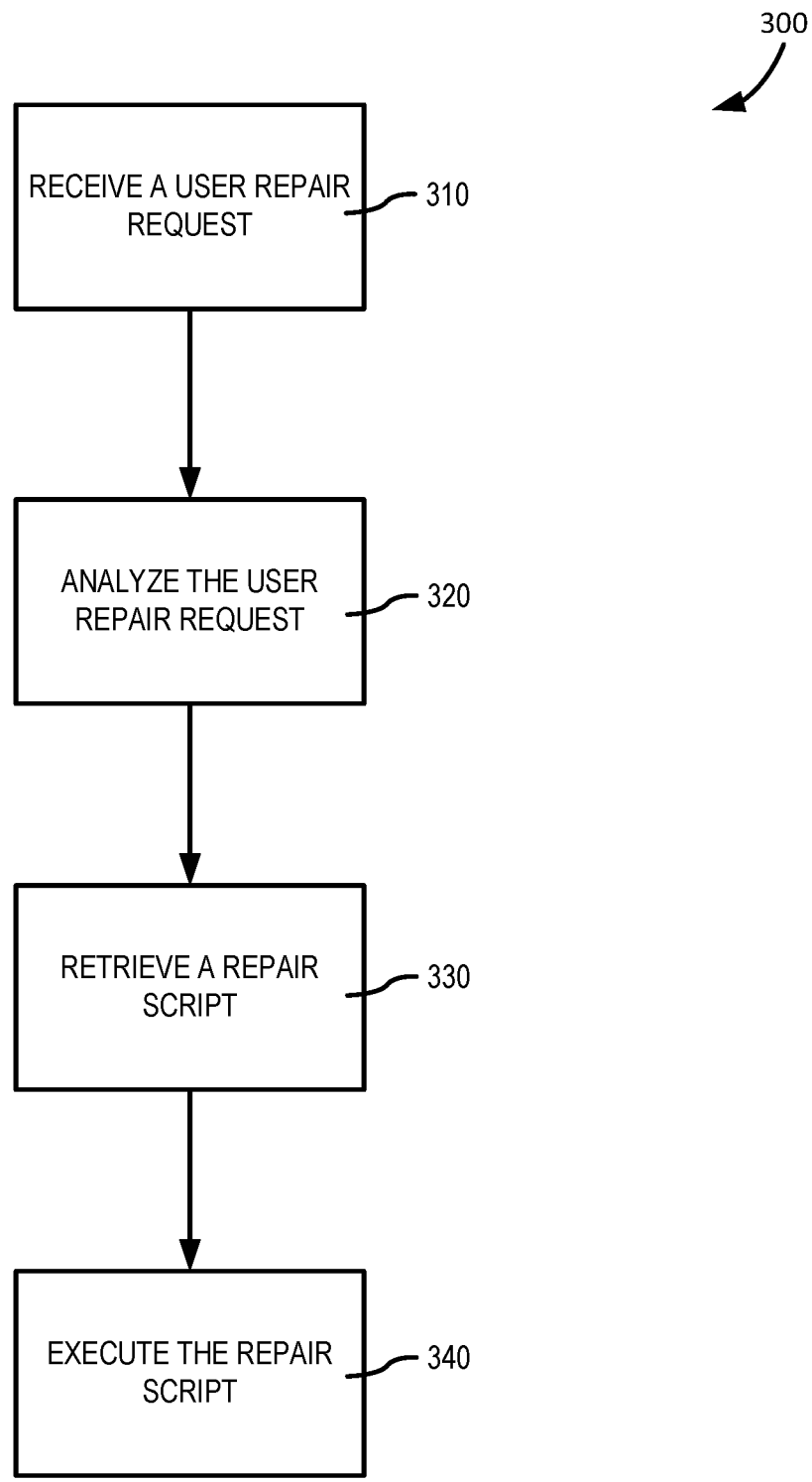
FIG. 3 illustrates a process flow for automated computer system repair, in accordance with various embodiments.
Figure 4:
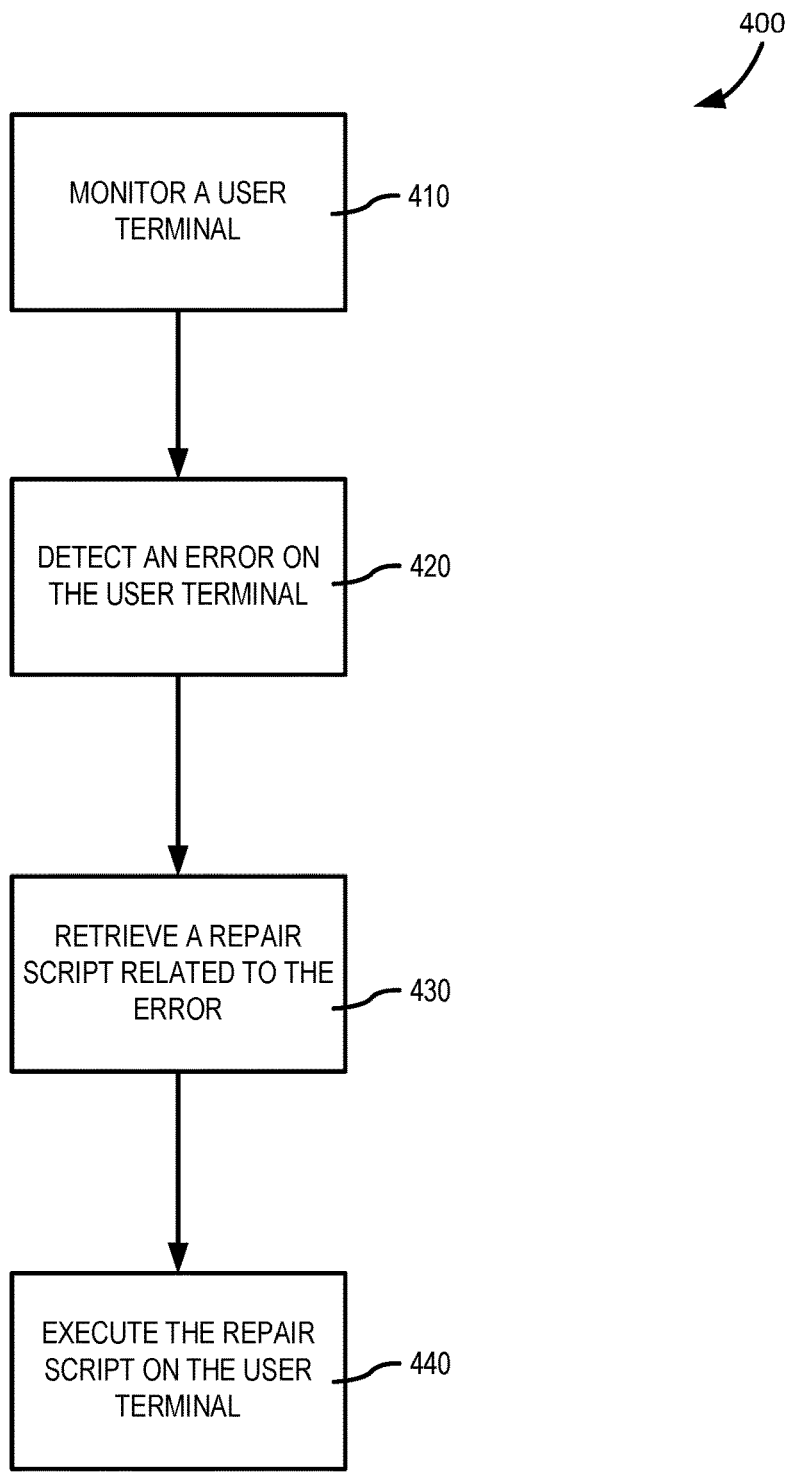
FIG. 4 illustrates a process flow for automated computer system diagnosis and repair, in accordance with various embodiments.
Figure 5:
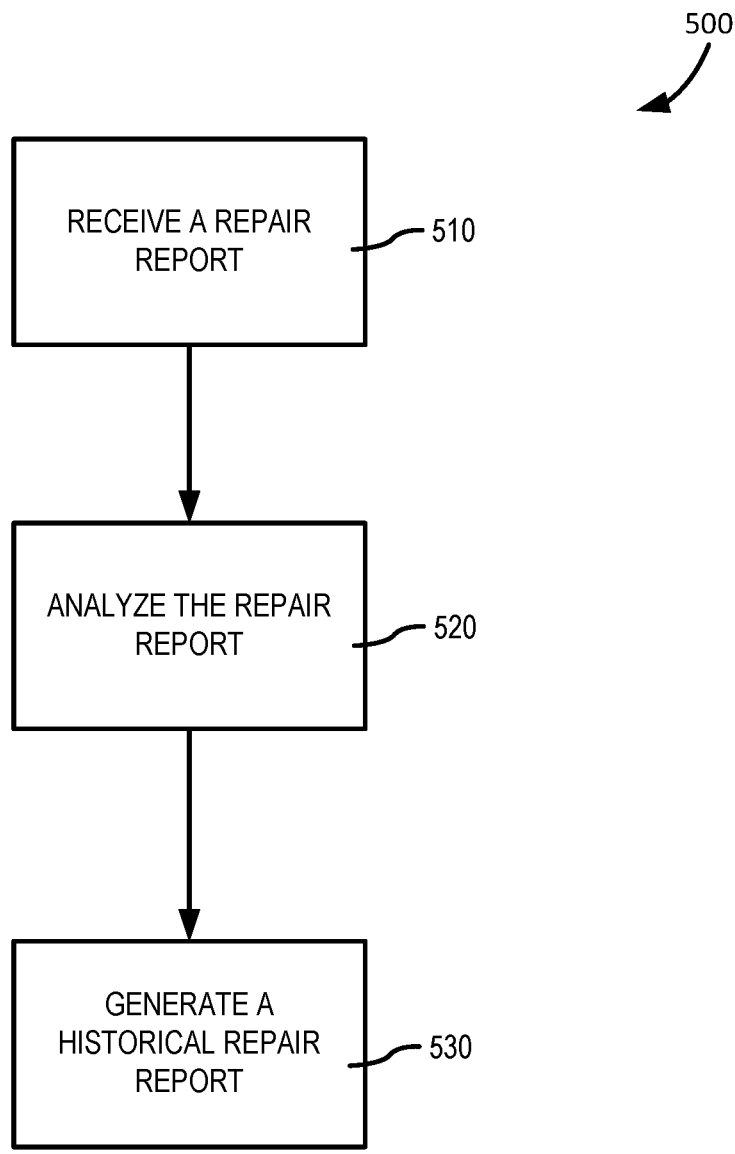
FIG. 5 illustrates a process flow for computer system repair reporting, in accordance with various embodiments.

Referring now to FIGS. 3-5, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 3-5, but also to the various system components as described above with reference to FIGS. 1 and 2.

The methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

In various embodiments, and with reference to FIG. 3, and continued reference to FIG. 1, a method 300 for automated computer system repair is disclosed. Method 300 may comprise receiving a user repair request (step 310). Tech care modules 130 may receive the user repair request from user terminals 120. A user may interact with tech care module 130, via user terminal 120, to input the user repair request. The user may input the user repair request using any technique described herein. For example, the user may respond to a repair prompt displayed by tech care module 130, via user terminal 120, by selecting the software application causing the computer system error, and then selecting the associated repair script related to the computer system error (e.g., by selecting a repair script title, description, and/or the like). The user may also manually input, via user terminal 120, a user repair request comprising a description of the computer system error. The user may also interact with a chatbot component to facilitate input of the user repair request from user terminal 120. Tech care module 130 may transmit, via network 118, the user repair request to diagnosis and repair server 110.

Method 300 may comprise analyzing the user repair request (step 320). Diagnosis and repair server 110 may analyze the user repair request received from the corresponding tech care module 130. For example, diagnosis and repair server 110 may analyze and parse the user repair request to determine the computer system error, the corresponding software application causing the error, and/or the repair script ID, if provided. For example, diagnosis and repair server 110 may parse the user repair request to search for keywords comprising and/or indicating the computer system error.

Method 300 may comprise retrieving a repair script (step 330). Diagnosis and repair server 110 may retrieve the repair script from script database 115. Diagnosis and repair server 110 may retrieve the repair script based on the repair script ID (if provided), and/or may attempt to match or associate the user repair request to a repair script. For example, diagnosis and repair server 110 may query script database 115 for a match of the computer system error, corresponding software application, and/or the like. In that regard, diagnosis and repair server 110 may query for an exact match, a partial match, and/or any other suitable match threshold. In response to locating a repair script matching the user repair request, diagnosis and repair server 110 may transmit the repair script, via network 118, to the corresponding tech care module 130.

In various embodiments, method 300 may comprise executing the repair script (step 340). Tech care module 130 may execute the repair script on the corresponding user terminal 120. Tech care module 130 may execute each repair step in the repair script on the corresponding user terminal 120.

In various embodiments, and with reference to FIG. 4, and continued reference to FIG. 1, a method 400 for automated computer system diagnosis and repair is disclosed. Method 400 may comprise monitoring a user terminal 120 (step 410). Each tech care module 130 may monitor the corresponding user terminal 120. Tech care modules 130 may monitor user terminals 120 by monitoring an event log, system log, error log, and/or the like residing on each user terminal 120. Tech care modules 130 may monitor each corresponding user terminal 120 in real time, in near real time, in time intervals (e.g., once a minute, once an hour, once a day, once a month, etc.) and/or based on a system event (e.g., after an update has installed on user terminal 120).

Method 400 may comprise detecting a computer system error on the user terminal 120 (step 420). Tech care modules 130 may detect the computer system error from the event log, system log, error log, and/or the like residing on each user terminal 120. In response to detecting the computer system error, tech care modules 130 may analyze the computer system error to determine properties relating to the computer system error, such as, for example, the application causing the error, an error code, and/or the like. In various embodiments, tech care modules 130 may transmit the detected computer system error and/or data relating to the computer system error to diagnosis and repair server 110, via network 118.

Method 400 may comprise retrieving a repair script relating to the computer system error (step 430). Diagnosis and repair server 110 may retrieve the repair script from script database 115. Diagnosis and repair server 110 may retrieve the repair script relating to the detected computer system error. For example, diagnosis and repair server 110 may search script database 115 to locate the repair script having metadata, tags, and/or the like matching the properties of the detected computer system error (e.g., the error code, the application causing the error, etc.). Diagnosis and repair server 110 may retrieve the repair script with the closest match (e.g., an exact match, a partial match, etc.) to the detected computer system error. In various embodiments, method 400 may comprise executing the repair script on the user terminal 120 (step 440). Diagnosis and repair server 110 may transmit the repair script, via network 118, to the corresponding tech care module 130. Tech care module 130 may execute the repair script on the corresponding user terminal 120. Tech care module 130 may execute each repair step in the repair script on the corresponding user terminal 120.

In various embodiments, and with reference to FIG. 5, and continued reference to FIG. 2, a method 500 for repair reporting is disclosed. Method 500 may comprise receiving a repair report (step 510). Tech care modules 130 may receive the repair report from the corresponding user terminal 120. For example, in response to executing the repair script on a user terminal 120 (e.g., step 340 with brief reference to FIG. 3 and/or step 440 with brief reference to FIG. 4), repair reporting module 235, via tech care module 130, may transmit a repair report prompt to the corresponding user terminal 120. The repair report prompt may prompt user terminal 120 to answer whether the computer system error is resolved and/or for any additional follow up, as needed. In response to the user answering the repair report prompt, user terminal 120 may transmit the repair report comprising the user's answers to the corresponding tech care module 130. Tech care modules 130 may transmit the repair report, via network 118, to diagnosis and repair server 110.

In various embodiments, method 500 may comprise analyzing the repair report (step 520). Diagnosis and repair server 110 may analyze the repair report to determine the success and failures of each repair script. For example, diagnosis and repair server 110 may track each success and each failure of the each repair script to determine a repair success rate (e.g., 90% success rate, etc.) for each repair script. In various embodiments, method 500 may comprise generating a historical repair report (step 530). Diagnosis and repair server 110 may generate the historical repair report. Diagnosis and repair server 110 may generate a historical repair report comprising data relating to each repair script, such as, for example, frequency of the computer system error, the repair success rate, and/or any other suitable data relating to the repair script. In that regard, the historical repair report may enable review of the repair scripts to determine accuracy and efficiency of each repair script.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "transmit" may include sending electronic data from one system component to another over a network connection. Additionally, as used herein, "data" may include encompassing information such as commands, queries, files, data for storage, and the like in digital or any other form.

The disclosure and claims do not describe only a particular outcome of automated diagnosis and repair of computer systems (e.g., user terminals 120), but the disclosure and claims include specific rules for implementing the outcome of repairing the computer systems and that render information into a specific format that is then used and applied to create the desired results of automated computer system repair, as set forth in *McRO, Inc. v. Bandai Namco Games America Inc.* (Fed. Cir. case number 15-1080, Sep. 13, 2016). In other words, the outcome of automated diagnosis and repair of computer systems can be performed by many different types of rules and combinations of rules, and this disclosure includes various embodiments with specific rules. While the absence of complete preemption may not guarantee that a claim is eligible, the disclosure does not sufficiently preempt the field of automated diagnosis and repair of computer systems at all. The disclosure acts to narrow, confine, and otherwise tie down the disclosure so as not to cover the general abstract idea of just diagnosing and repairing computer systems. Significantly, other systems and methods exist for diagnosing and repairing computer systems, so it would be inappropriate to assert that the claimed invention preempts the field or monopolizes the basic tools of diagnosing and repairing computer systems. In other words, the disclosure will not prevent others from diagnosing and repairing computer systems, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. With brief reference to FIG. 1, system 100 may include generating customized information and alerting a remote subscriber that the information can be accessed from their computer (e.g., user terminals 120). The alerts are generated by filtering received information, building information alerts and formatting the alerts into data blocks based upon subscriber preference information, via tech care modules 130, for example. The data blocks are transmitted to the subscriber's wireless device, which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet (e.g., network 118) when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user (via user terminals 120). By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen (e.g., via user terminals 120); displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer (e.g., user terminal 120) from being compromised, for example by being infected with a computer virus. The system may scan, via tech care modules 130, for example, electronic communications for malicious computer code and clean the electronic communication before it may initiate malicious acts. The system operates by physically isolating a received electronic communication in a "quarantine" sector of the computer memory on user terminals 120. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, system 100 may also address the problem of retaining control over customers during affiliate purchase transactions, using a system for co-marketing the "look and feel" of the host web page with the product-related content information of the advertising merchant's web page. System 100 can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

Phrases and terms similar to a "party" may include any individual, consumer, customer, group, business, organization, government entity, transaction account issuer or processor (e.g., credit, charge, etc.), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, Facebook® message, Twitter® tweet and/or message, MMS, and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as a processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system may also include a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein, such as, for example, script database 115 (with brief reference to FIGS. 1 and 2), may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may then be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, popup window, and the like.

Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The systems and methods are described herein with reference to screen shots, block diagrams and flowchart illustrations of methods, apparatus (e.g., systems), and computer program products according to various embodiments.

It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In re Nuijten* to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   receiving, by a processor, a user repair request from a tech care module, wherein the user repair request comprises an error associated with a software application on a user terminal;
   analyzing, by the processor, the user repair request to determine at least one of the error, the software application causing the error, a hardware causing the error, or a repair script ID;
   retrieving, by the processor, a repair script related to the software application in the user repair request, wherein the repair script is retrieved based at least in part on at least one of the error or the repair script ID;
   transmitting, by the processor, the repair script to the tech care module, wherein in response to receiving the repair script, the tech care module executes the repair script on the user terminal to repair the error associated with the software application; and
   dynamically updating, by the processor, the repair script in response to determining that at least one repair step in the repair script has failed on at least a threshold number of user terminals including the user terminal and at least one other user terminal.

2. The method of claim 1, wherein the user terminal comprises a user terminal profile comprising at least one of a hardware configuration or a software configuration.

3. The method of claim 2, wherein the tech care module is configured to receive the user repair request from the user terminal based at least in part on the user terminal profile.

4. The method of claim 1, wherein the repair script comprises a dynamic logical repair step configured to execute and return a repair result value, and wherein the repair result value determines a second logical repair step to be executed.

5. The method of claim 1, further comprising receiving, by the processor, a repair report from the user terminal, wherein the repair report comprises data relating to the execution of the repair script by the tech care module.

6. The method of claim 5, further comprising analyzing, by the processor, the repair report to determine whether the repair script resolved the error from the user repair request.

7. The method of claim 6, further comprising generating, by the processor, a historical repair report comprising data relating to an analysis of the repair report.

8. A system comprising:
a processor; and
a tangible, non-transitory memory configured to communicate with the processor, the tangible, non-transitory memory having instructions stored thereon that, in response to execution by the processor, cause the processor to perform operations comprising:
receiving, by the processor, a user repair request from a tech care module, wherein the user repair request comprises an error associated with a software application on a user terminal;
analyzing, by the processor, the user repair request to determine at least one of the error, the software application causing the error, a hardware causing the error, or a repair script ID;
retrieving, by the processor, a repair script related to the software application in the user repair request, wherein the repair script is retrieved based at least in part on at least one of the error or the repair script ID;
transmitting, by the processor, the repair script to the tech care module, wherein in response to receiving the repair script, the tech care module executes the repair script on the user terminal to repair the error associated with the software application; and
dynamically updating, by the processor, the repair script in response to determining that at least one repair step in the repair script has failed on at least a threshold number of user terminals including the user terminal and at least one other user terminal.

9. The system of claim 8, wherein the user terminal comprises a user terminal profile comprising at least one of a hardware configuration or a software configuration.

10. The system of claim 9, wherein the tech care module is configured to receive the user repair request from the user terminal based at least in part on the user terminal profile.

11. The system of claim 8, wherein the repair script comprises a dynamic logical repair step configured to execute and return a repair result value based at least in part on the execution, and wherein the repair result value determines a second logical repair step to be executed.

12. The system of claim 8, further comprising receiving, by the processor, a repair report from the user terminal, wherein the repair report comprises data relating to the execution of the repair script by the tech care module.

13. The system of claim 12, further comprising analyzing, by the processor, the repair report to determine whether the repair script resolved the error from the user repair request.

14. The system of claim 13, further comprising generating, by the processor, a historical repair report comprising data relating to an analysis of the repair report.

15. An article of manufacture including a non-transitory, tangible computer readable storage medium having instructions stored thereon that, in response to execution by a computer based system, cause the computer based system to perform operations comprising:
receiving a user repair request from a tech care module, wherein the user repair request comprises an error associated with a software application on a user terminal;
analyzing the user repair request to determine at least one of the error, the software application causing the error, a hardware causing the error, or a repair script ID;
retrieving a repair script related to the software application in the user repair request, wherein the repair script is retrieved based at least in part on at least one of the error or the repair script ID;
transmitting the repair script to the tech care module, wherein in response to receiving the repair script, the tech care module executes the repair script on the user terminal to repair the error associated with the software application; and
dynamically updating the repair script in response to determining that at least one repair step in the repair script has failed on at least a threshold number of user terminals including the user terminal and at least one other user terminal.

16. The article of manufacture of claim 15, wherein the user terminal comprises a user terminal profile comprising at least one of a hardware configuration or a software configuration, and wherein the tech care module is configured to receive the user repair request from the user terminal based at least in part on the user terminal profile.

17. The article of manufacture of claim 15, wherein the repair script comprises a dynamic logical repair step configured to execute and return a repair result value based at least in part on the execution, and wherein the repair result value determines a second logical repair step to be executed.

18. The article of manufacture of claim 15, further comprising receiving a repair report from the user terminal, wherein the repair report comprises data relating to the execution of the repair script by the tech care module.

19. The article of manufacture of claim 18, further comprising analyzing the repair report to determine whether the repair script resolved the error from the user repair request.

20. The article of manufacture of claim 19, further comprising generating a historical repair report comprising data relating to an analysis of the repair report.

* * * * *